US012541071B2

(12) United States Patent
Menguy (10) Patent No.: US 12,541,071 B2
(45) Date of Patent: Feb. 3, 2026

(54) CABLE PORT SEAL ASSEMBLY

(71) Applicant: CORNING RESEARCH & DEVELOPMENT CORPORATION, Corning, NY (US)

(72) Inventor: Michel Teva Menguy, La Chevallerais (FR)

(73) Assignee: CORNING RESEARCH & DEVELOPMENT CORPORATION, Corning, NY (US)

(*) Notice: Subject to any disclaimer, the term of this patent is extended or adjusted under 35 U.S.C. 154(b) by 307 days.

(21) Appl. No.: 18/319,789

(22) Filed: May 18, 2023

(65) Prior Publication Data

US 2023/0384551 A1    Nov. 30, 2023

Related U.S. Application Data

(60) Provisional application No. 63/345,191, filed on May 24, 2022.

(51) Int. Cl.
  *G02B 6/44* (2006.01)
(52) U.S. Cl.
  CPC ................ *G02B 6/44775* (2023.05)
(58) Field of Classification Search
  CPC .................................. G02B 6/44775
  See application file for complete search history.

(56) References Cited

U.S. PATENT DOCUMENTS

2022/0244480 A1* 8/2022 Kusmierek ........ G02B 6/44775
2022/0382008 A1* 12/2022 Coenegracht ...... G02B 6/44775

FOREIGN PATENT DOCUMENTS

| WO | 97/41474 A1 | 11/1997 |
| WO | 2021/045908 A1 | 3/2021 |
| WO | 2021/096859 A1 | 5/2021 |

OTHER PUBLICATIONS

European Patent Application No. 23174451.7, Extended European Search Report dated Sep. 25, 2023; 8 pages; European Patent Office.

* cited by examiner

*Primary Examiner* — Sung H Pak
(74) *Attorney, Agent, or Firm* — Kapil U. Banakar (57) ABSTRACT

A cable port seal is provided including an upper and lower elements for cables to pass and be compressed therebetween to provide a environmental barrier. The upper or lower elements include a first sealing member having a first face, an opposing second face, and a first sealing edge with a first and second ends, the first sealing edge including first cable cutouts disposed proximate to each of the first and second ends of the first sealing member, a second sealing member having a third face, an opposing fourth face, and a second sealing edge with a first and second ends, the second sealing edge including at least one second cable cutout disposed proximate to each of the first end and the second end of the second sealing member, and at least one third cable cutout disposed between each of the at least one second cable cutouts.

20 Claims, 9 Drawing Sheets

CABLE PORT SEAL ASSEMBLY

PRIORITY APPLICATION

This application claims the benefit of priority of U.S. Provisional Application No. 63/345,191, filed on May 24, 2022, the content of which is relied upon and incorporated herein by reference in its entirety.

FIELD

This disclosure generally pertains to cable routing, and more particularly to a cable port seal assembly.

BACKGROUND

In communication networks, such as copper and fiber optic networks, include copper and/or fiber optic cables may be connected to various assemblies (e.g., hardware, housings, enclosures, etc.). The copper or fiber optic assemblies, e.g. "terminals", may include a seal configured to protect the internal components of the terminal and limit entrance of water and/or debris. Terminals for telecommunication networks may include different solutions for the sealing of the cable entries of different cable diameters. Some of these solutions include cable glands, rubber membranes, or sealing foams.

Typical sealing foams may include a plurality of pre-cuts, or perforations, for different cable diameters. However, use of the cable cuts requires the cable diameter to be measured in the field and a portion of the foam removed. If the installer mismeasured the outer diameter for the cable or the incorrect portion of the foam is removed, the cable port of the terminal will not be sealed properly, which may allow for debris and/or water to enter the terminal.

SUMMARY

In an example embodiment, a cable port seal is provided. The cable port seal may include a plurality of sealing members configured to seal about different cable diameters on a terminal without modification by the installer in the field. The multilayer foam cable seal includes a "self-adjusting" capability on large range of different cable OD. Therefore, proper sealing of the terminal is consequently not dependent on the installer's measurements or modifications of the cable seal foam. Compared to some other existing solutions, the present cable port seal eliminates the need to measure the cable OD and eliminates the need to cut, move or remove any portion of the sealing device, prior to the installation of the cable onto the copper or fiber optic terminal. In some example embodiments, the cable port seal may be produced as a single piece from generally thin foam with simple technologies, which consequently give a cost advantage versus some existing foam-based solutions. The single foam may then be folded or detached and stacked into a multi-layer form. In some embodiments, several thin foams may be cut at the same time for obtaining more one-piece components in a single cutting operation (e.g. in one stamping or water jet cutting operation), which may further reduce costs compared to existing thick foam solutions.

Additional features and advantages will be set forth in the detailed description which follows, and in part will be apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like features. The drawings are not necessarily to scale for ease of illustration an explanation.

DETAILED DESCRIPTION

Optical fibers are useful in a wide variety of applications, including the telecommunications industry for voice, video, and data transmissions. The benefits of optical fiber are well known and include higher signal-to-noise ratios and increased bandwidth compared to conventional copper-based transmission technologies. To meet modern demands for increased bandwidth and improved performance, telecommunication networks are increasingly providing optical fiber connectivity closer to end subscribers. These initiatives include fiber-to-the-node (FTTN), fiber-to-the-premises (FTTP), fiber-to-the-home (FTTH), and the like (generally described as FTTx).

Figure 1:
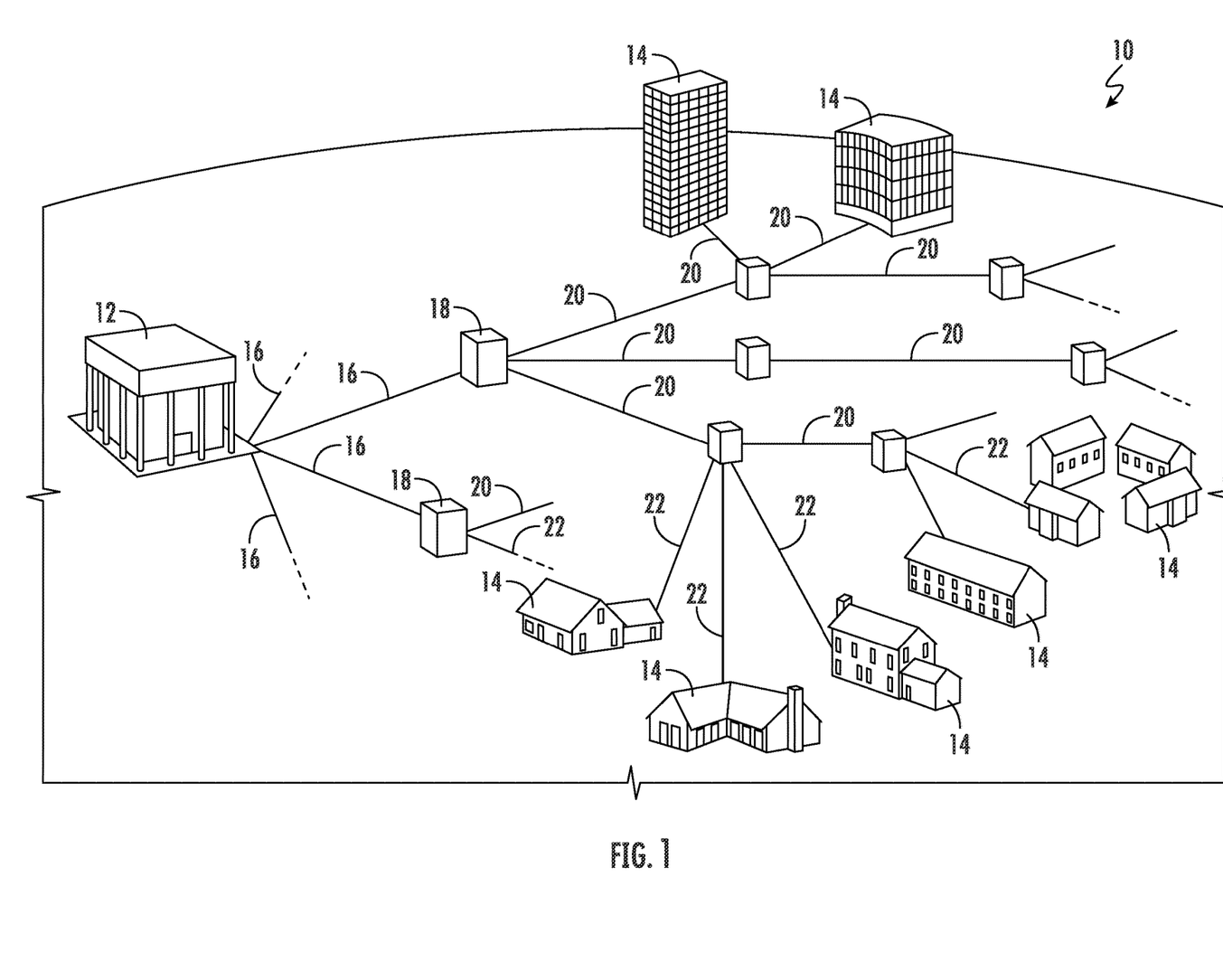
FIG. 1 is a schematic diagram of an exemplary FTTx network according to an example embodiment.

In an FTTx network, fiber optic cables are used to carry optical signals to various distribution points and, in some cases, all the way to end subscribers. For example, FIG. 1 is a schematic diagram of an exemplary FTTx network 10 that distributes optical signals generated at a switching point 12 (e.g., a central office of a network provider) to subscriber premises 14. Optical line terminals (OLTs; not shown) at the switching point 12 convert electrical signals to optical signals. Fiber optic feeder cables 16 then carry the optical signals to various local convergence points 18, which act as locations for splicing and making cross-connections and interconnections. The local convergence points 18 often include splitters to enable any given optical fiber in the fiber optic feeder cable 16 to serve multiple subscriber premises 14. As a result, the optical signals are "branched out" from the optical fibers of the fiber optic feeder cables 16 to optical fibers of distribution cables 20 that exit the local convergence points 18.

At network access points closer to the subscriber premises 14, some or all of the optical fibers in the distribution cables 20 may be accessed to connect to one or more subscriber premises 14. Drop cables 22 extend from the network access points to the subscriber premises 14, which may be single-dwelling units (SDU), multi-dwelling units (MDU), businesses, and/or other facilities or buildings. A SDU or MDU terminal may be disposed at the subscriber premises 14. A conversion of optical signals back to electrical signals may occur at the network access points or at the subscriber premises 14.

There are many different network architectures, and the various tasks required to distribute optical signals (e.g., splitting, splicing, routing, connecting subscribers) can occur at several locations. Regardless of whether a location is considered a switching point, local convergence point, network access point, subscriber premise, or something else, fiber optic equipment is used to house components that carry out one or more of the tasks. The fiber optic equipment may be assemblies that include connectors, splitters, splices, or the like. The term "fiber optic assembly" will be used in this disclosure to generically refer to such equipment (or at least portions thereof). In some instances, such equipment is located at a terminal at the subscriber premises 14 in an FTTx network, although this disclosure is not limited to any particular intended use. Further, although an FTTx network 10 is shown in FIG. 1, the same considerations apply with respect to other types of telecommunication networks or environments, such data centers and other enterprise network environments.

Figure 2:
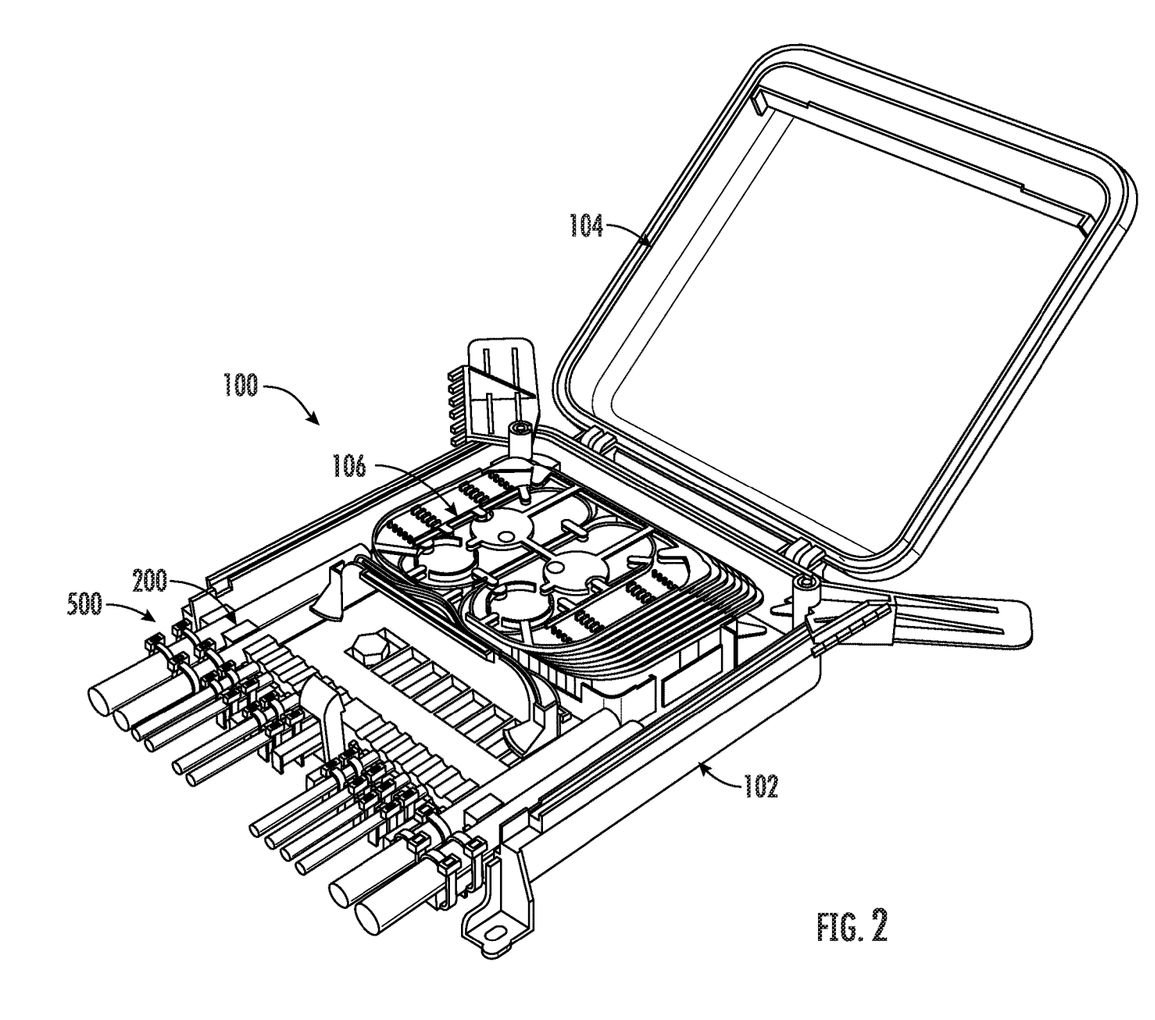
FIG. 2 illustrates an example multi-dwelling unit (MDU) terminal including a cable seal and strain relief assembly according to an example embodiment.

FIG. 2 illustrates an example fiber optic assembly or fiber optic terminal 100. In the provided example, the fiber optic terminal 100 is a multiple dwelling unit (MDU) terminal, that may be deployed at a subscriber premises 14. The fiber optic terminal 100 may include a housing having a back or base portion 102 and a cover portion 104. The base portion 102 and cover portion 104 may define an interior volume in which one or more fiber optic components may be disposed and protected from the external environment. In some example embodiments, the base portion 102 and the cover portion 104 may be connected by a hinge to enable access to the interior volume of the fiber optic terminal 100. The fiber optic terminal 100 may include one or more input cables 108 and may include one or more output cables 110.

The fiber optic terminal 100 may include a cable seal and strain relief assembly to provide an environmental seal for the housing and limit axial torsion applied to the input cables 108 or output cables 110. The cable seal and strain relief assembly may include a cable port seal 200 and a cable strain relief 500. Although discussed herein as an assembly, the cable port seal 200 may be utilized with other strain relief solutions. The MDU may include one or more trays 106 or modules configured to optically connect the input cables 108 to the output cables 110, including splitting, splicing, fanouts or breakouts, patching, or other operations. The fiber optic terminal provided in FIG. 2 is merely for illustrative purposes, one of ordinary skill in the art would immediately appreciate that the cable port seal 200 described herein may be utilized in any fiber optic assembly, including local convergence points (LCP), SDU terminals, or the like. Further, although the terminal disclosed herein is a fiber optic terminal, other communication types, such as copper communication terminals and cables are also contemplated for use with the described cable port seal 200.

Figure 3:
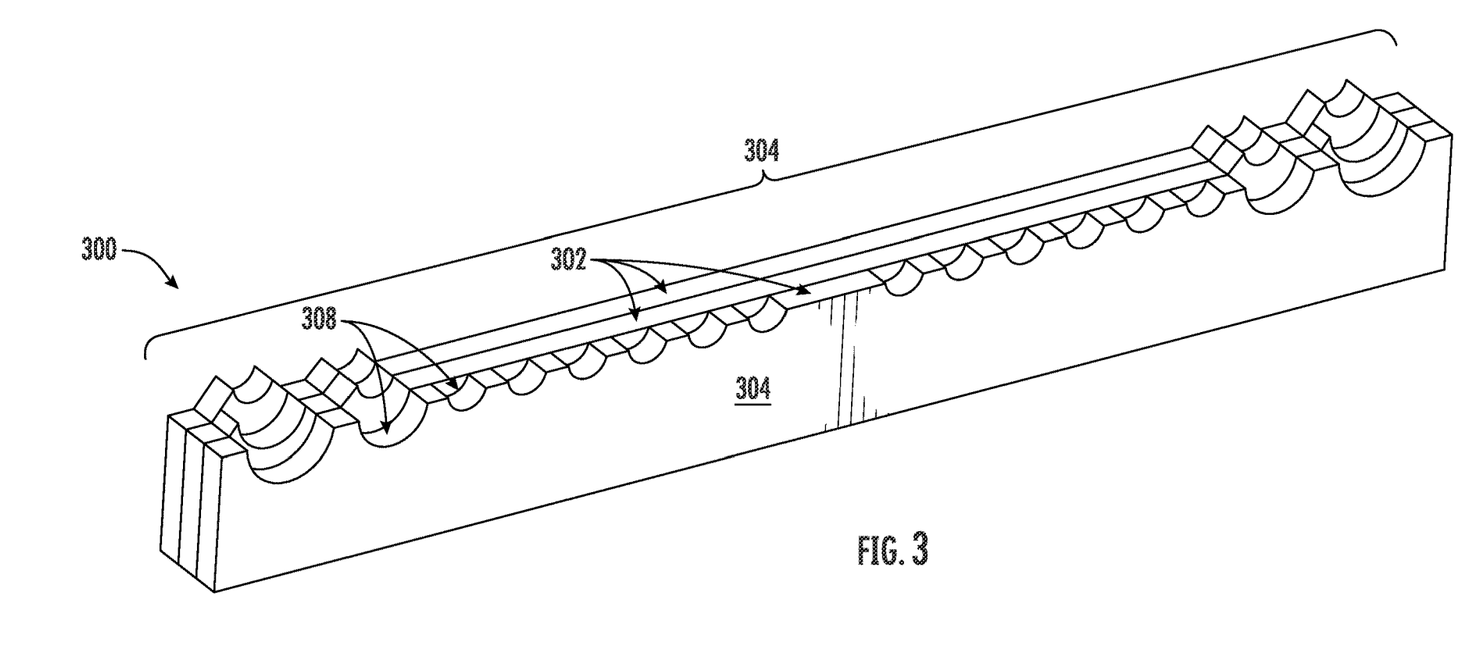
FIG. 3 illustrates and example cable port seal according to an example embodiment.

FIG. 3 illustrates example cable port seal 200 according to an example embodiment. The cable port seal 200 may include one or more cable port seal elements, such as an upper element 202 and a lower element 204 depicted in FIGs. An input cable 108 or output cable 110 pass between the upper element 202 and the lower element 204, and be compressed therebetween to provide a water and/or debris resistant environmental seal or barrier. In some example embodiments, the upper element 202 and/or the lower element 204 may be a multi-layer seal 300. The multi-layer seal 300 may include a plurality of sealing members 302, such as two seal members, three seal members, four sealing members, or the like. Each sealing member 302 may include opposing faces 304 and a sealing edge 306. Each sealing edge 306 may include one or more cable cutouts 308 to accommodate sealing about an input cable 108 and/or an output cable 110. For example, the cable cutouts 308 may be configured to seal about input cables 108 and/or output cables 110 with outer diameters of 6 mm, 12 mm, 15 mm, or the like. In some embodiments, the cable cutouts 308 may be semicircular, however other geometries are also contemplated, including without limitation, hexogen, rectangular, triangular, spoked, or the like. The sealing members 302 may be stacked such that the faces 304 of adjacent seal member may be in contact. In some embodiments, such as FIG. 7 discussed below, the upper element 202 or lower element 204 may be a seal block 400, having a sealing face and may include one or more cable cutouts 402.

Figure 4:
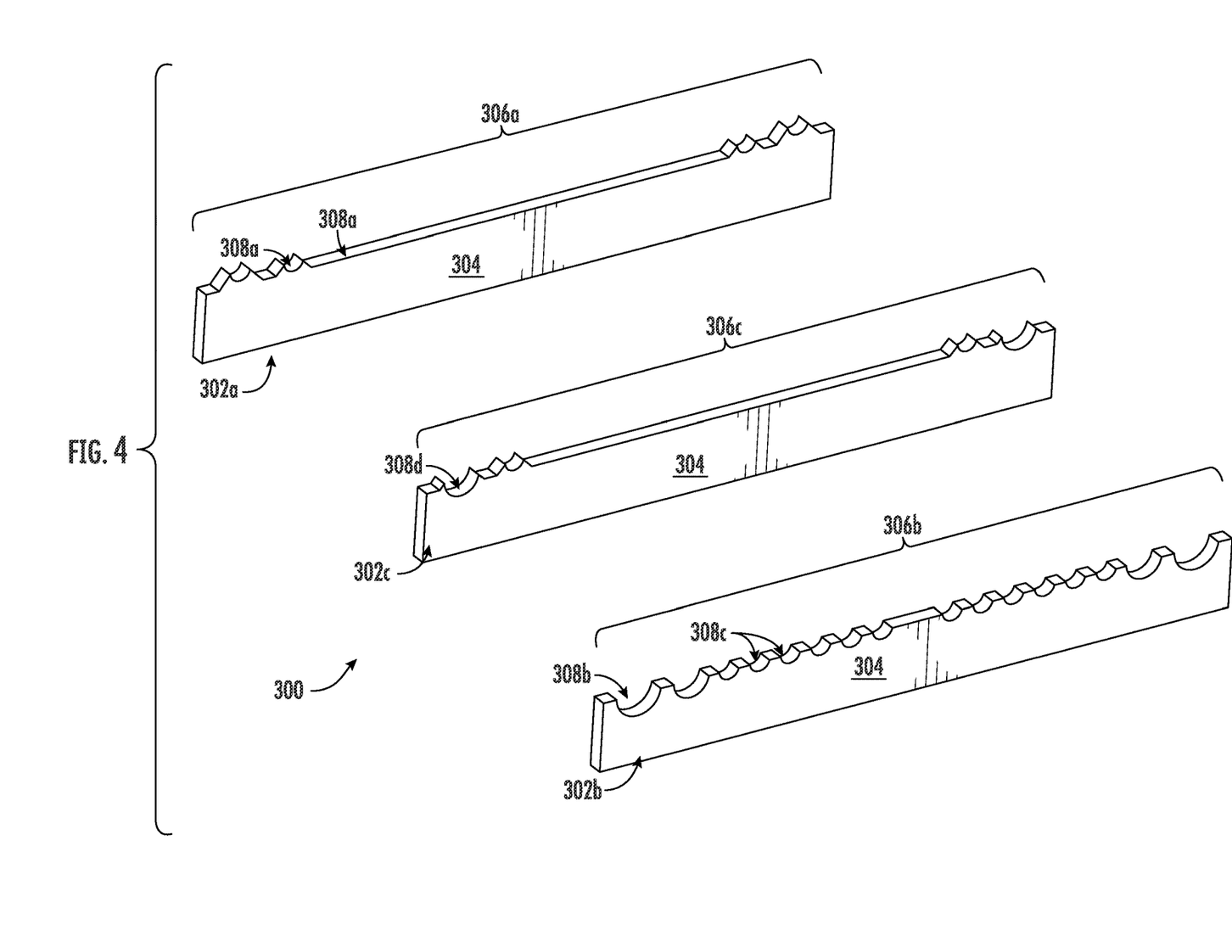
FIG. 4 illustrates an exploded view of an example cable port seal according to an example embodiment.
Figure 5:
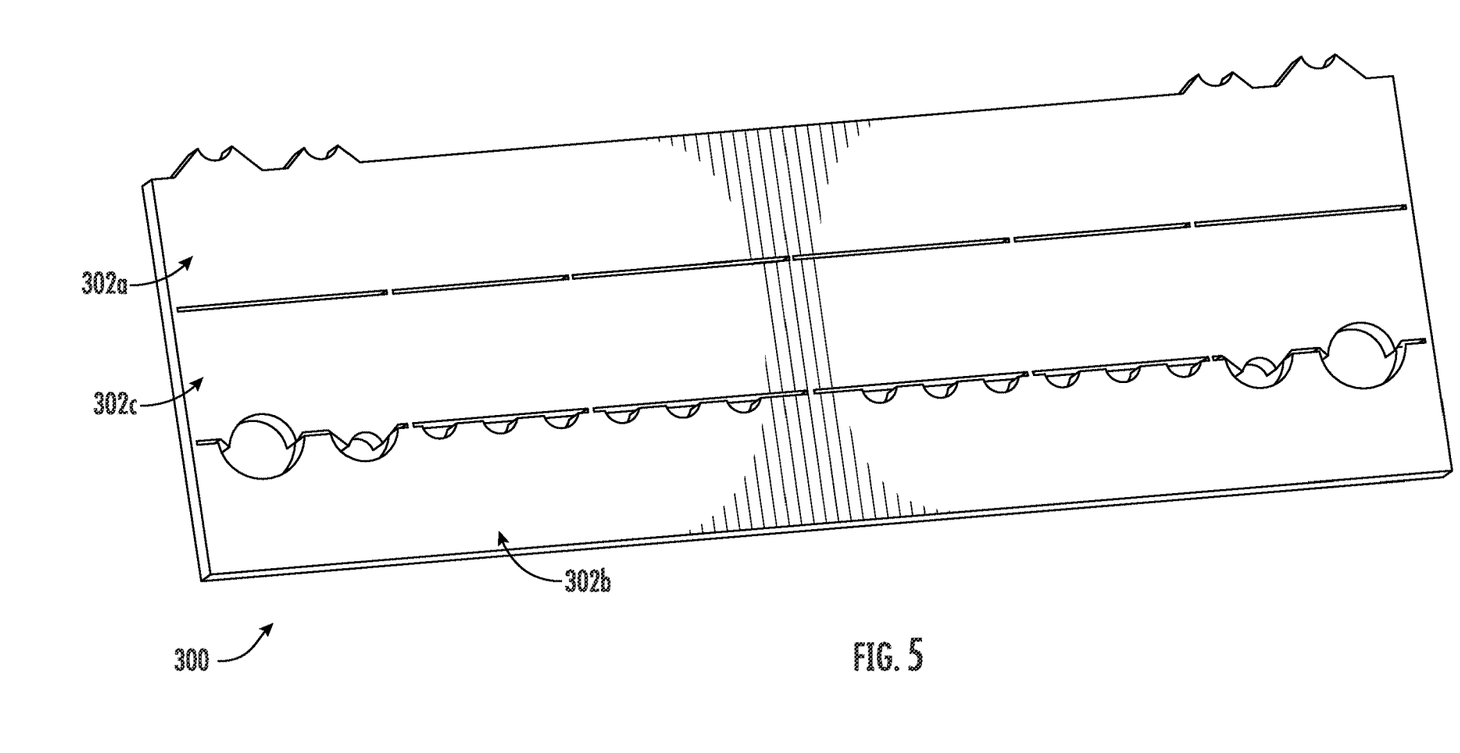
FIG. 5 illustrates a perspective view of an example cable port seal in a sheet form according to an example embodiment.
Figure 6:
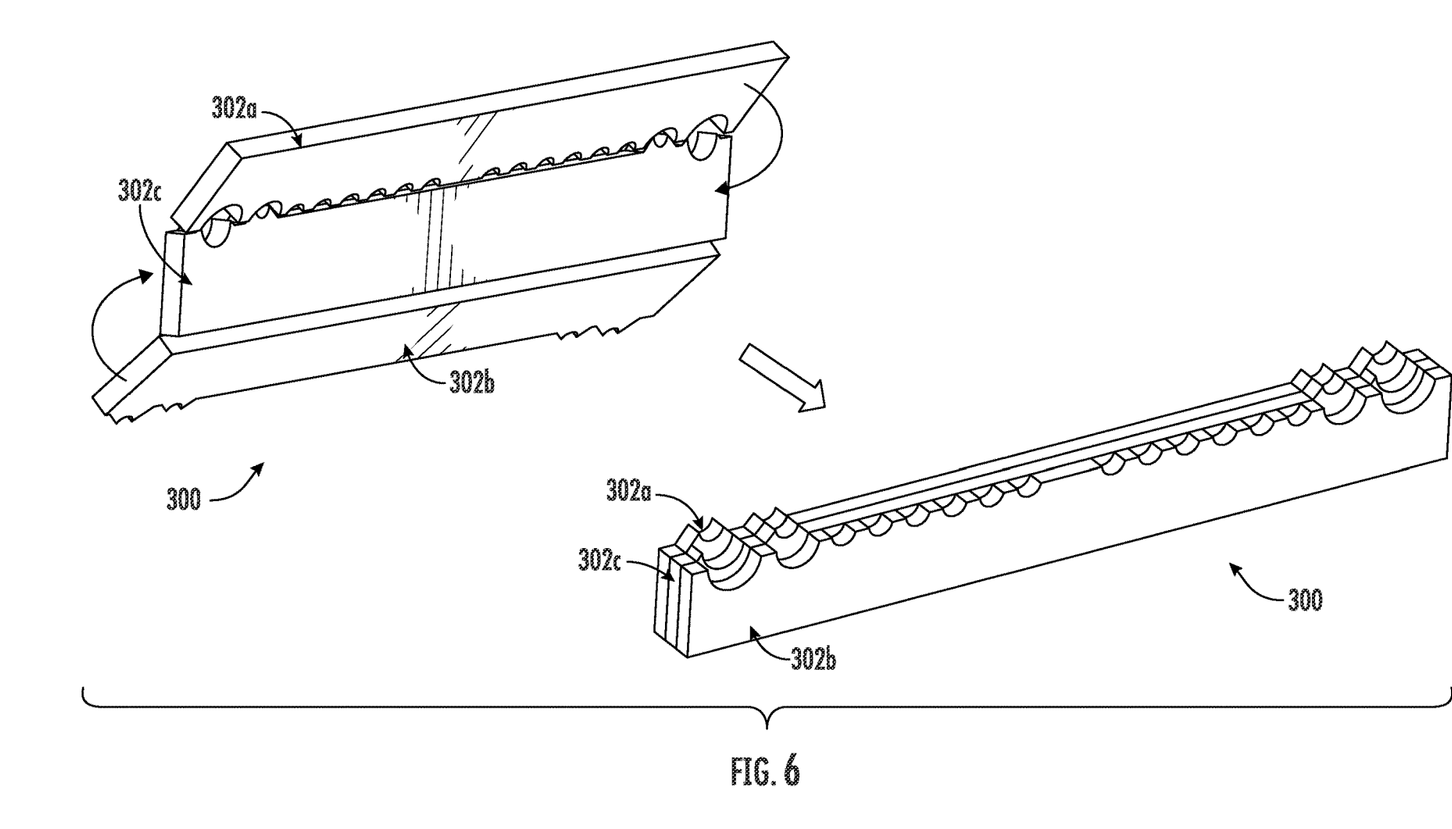
FIG. 6 illustrates a perspective view of an example cable port seal transitioning from the sheet form of FIG. 5 to a multi-layer form according to an example embodiment.

The sealing members 302 of the multi-layer seal 300 may be formed from one or more materials with sufficient compressibility and sealing characteristics, such as polyethylene foam, polyurethane foam, neoprene, silicone foam, rubber, or the like. Each of the sealing members 302 may be separate components, as depicted in FIG. 4. Alternatively, the sealing members 302 may be integrally formed from a sheet of sealing material, as depicted in FIG. 5. The sealing members 302 may be formed by stamping, such as with blades, water jet cutting, or other suitable methods. In embodiments in which the sealing members 302 are integrally formed, portions of the cuts may be partial or omitted, creating perforations, to enable folding while remaining a unitary element, as depicted in FIG. 5. The sealing members 302 may be stacked or folded, as discussed below, into the stack configuration shown in FIG. 3. FIG. 6 depicted the transition of the multi-layer seal 300 from the sheet form to the multi-layer form by folding. In some example embodiments the sealing members 302 may be formed separately, or the sealing members 302 may be disconnected from each other at the perforations. These individual sealing elements may then be stacked to form the multi-layer form of the multi-layer seal 300.

The sealing members 302 may be approximately 5 mm thick, such that two sealing members 302, in the stacked configuration, would be 10 mm and three sealing members 302, in the stacked configuration, would be 15 mm thick. Although two and three layer embodiments are discussed, any suitable number of layers or sealing members 302 may be utilized.

In embodiments in which the sealing members 302, or a portion of the sealing members 302, are not integrally formed, the sealing members 302 may include different thickness and/or materials. For example, a first sealing member 302 may be 10 mm thick and formed from polyethylene foam and a second sealing member 302 may be 5 mm thick and formed from silicone foam.

Turning to FIG. 4, an exploded view of a multi-layer seal 300 is provided. Each of the sealing members 302 may include the same or a different configuration of cable cutouts 308. The different configurations of cable cutouts 308 may include a first cable cutout 308a in a first sealing member 302a with a diameter that is smaller than the outer diameter of the input cable 108 or output cable 110, and a second cable cutout 308b in a second sealing member 302b, or subsequent sealing member, approximately the diameter of the outer diameter of the input cable 108. The sealing material around the first cable cutout 308a of the smaller diameter may be compressed about the periphery of the input cable 108 or output cable 110 to create the environmental seal. In some embodiments, the first sealing member 302a may include at least one first cable cutout 308 disposed proximate to each end of the first sealing member 302a, which may be smaller than the diameter of the output cable 110. The second sealing member 302b may include at least one second cable cutout 308b disposed proximate to each end of the second sealing member 302b. The second sealing edge 306b may also include at least one third cable cutout 308c disposed between each of the at least one second cable cutouts. In an example embodiment, the third cable cutout 308 may be approximately the diameter of the output cables 110, e.g subscriber cables. The first sealing edge 306a may include cable cutouts 308 of a dimeter smaller than the output cables 110 or may not include cable cutouts 308 for the output cables 110. In a manner similar to the input cables 108, described above, the sealing material of the first sealing member 302a may be compressed about the periphery of the output cable 110 to create an environmental seal.

In some example embodiments, the multi-layer seal 300 includes a third sealing member 302c. The third sealing member 302c may include opposing faces 304, and a third sealing edge 306c. The third sealing edge 306c may include at least one fourth cable cutout 308d disposed proximate to each of the first end and the second end of the third sealing member 302. The fourth cable cutout 308d comprises a different diameter than the first cable cutout. In the depicted embodiment, the fourth cable cutout 308d may have a diameter between the first cable cutout diameter and the second cable cutout diameter, such that the first sealing member 302 is partially compressed about the input cable 108, but less compressed than the first sealing member 302a. The third sealing member 302c may include additional cable cutouts 308 between the fourth cable cutouts 308d corresponding to one or more output cables 110.

Although a specific cable cutout 308 arrangement is depicted in FIG. 4, any configuration of cable cutouts may be utilized based on the intended input cables 108 and/or output cables 110. The cable cutouts 308 may be configured to provide an environmental seal for the number of input cables 108 and/or output cables 110 and their respective cable diameters.

The environmental seal may be provided by the compression of the sealing members 302 about the input cables 108 and/or output cables 110, as well as against each other. The ingress protection (IP) rating of the cable port seal 200 may be based on the material from which the sealing members 302 are formed, the compression force applied, and/or the difference between the diameter of the cable cutout 308 and the outer diameter of the input cables 108 and/or output cables 110. The environmental seal may be one of IP44, IP54, IP55, IP56, IP65, or IP66.

Figure 7:
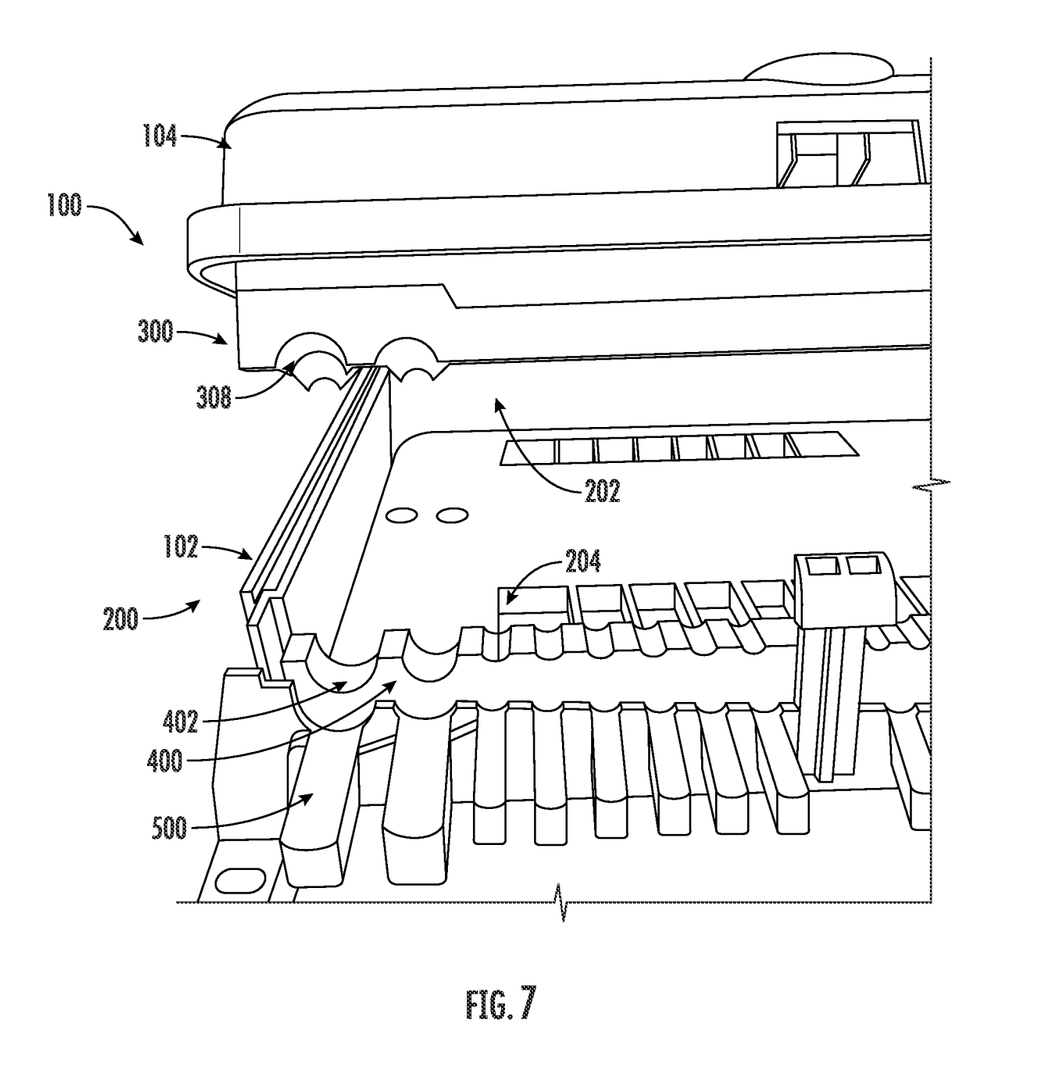
FIG. 7 illustrates a perspective view of a cable port seal in a fiber optic assembly in an open position according to an example embodiment.

FIG. 7 illustrates a perspective view of a cable port seal 200 in a fiber optic terminal 100 in an open position according to an example embodiment. The cable port seal 200 may include a multi-layer seal 300 as the upper element 202 and a sealing block 400 as the lower element 204. In some embodiments, the sealing block 400 may include one or more cable cutouts 402 in the sealing face of the sealing block. In other embodiments, a multi-layer seal 300 may be provided in both the upper element 202 and the lower element 204. The sealing face of the sealing block 400 may be disposed opposite to the sealing edges 306 of the sealing members 302, such that when the cover portion 104 is transitioned to the closed position, as depicted in FIG. 8, an environmental seal is formed therebetween.

Figure 9:
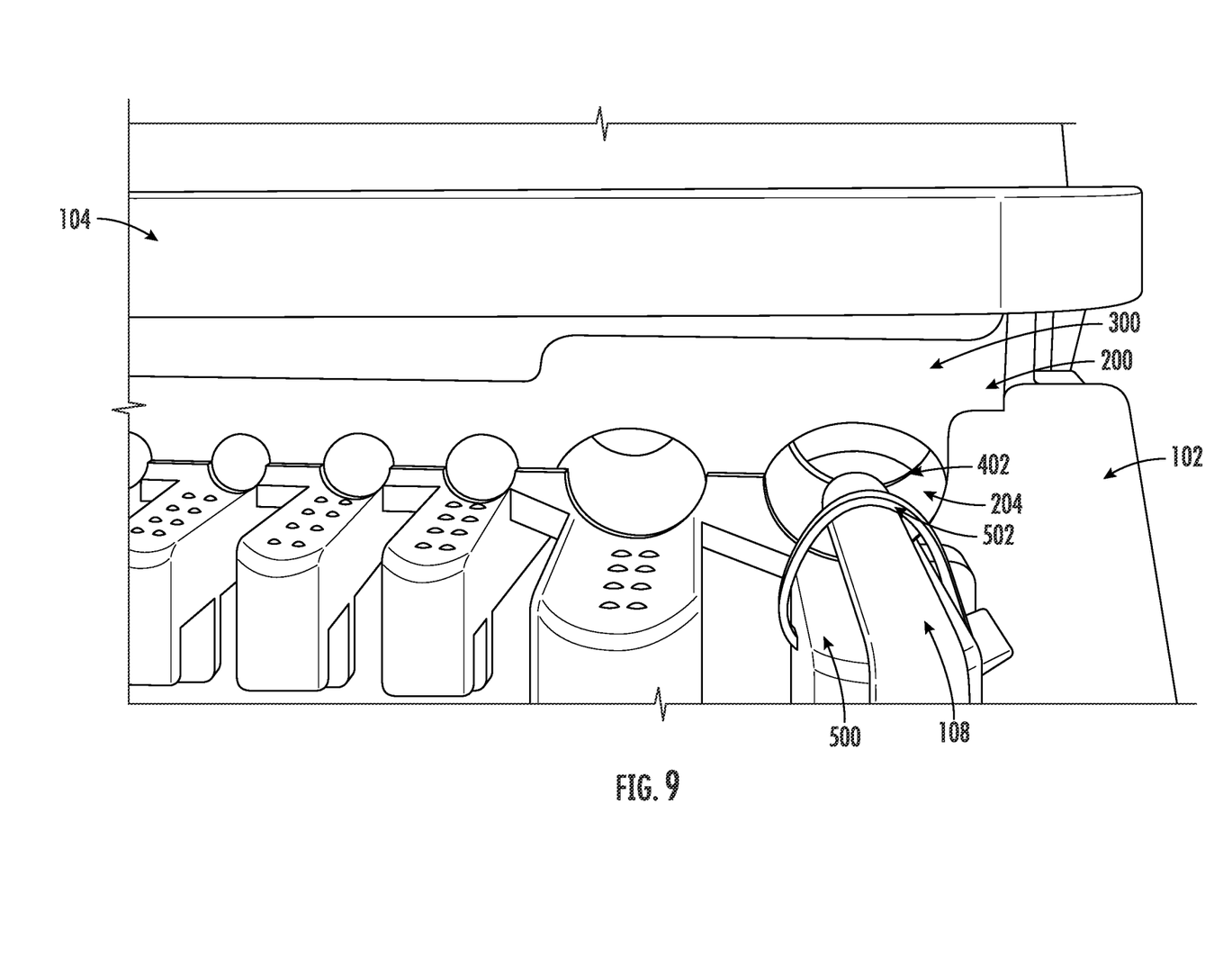
FIG. 9 illustrates the cable port seal of FIGS. 7 and 8 with a cable installed according to an example embodiment.

The fiber optic terminal 100 includes a cable strain relief 500. The depicted cable strain relief 500 comprises an extension of the terminal base away from the cable port seal 200 and external to the fiber optic terminal 100. An input cable 108 or output cable 110 may be positioned on the strain relief element and held in place by a cable tie 502 or other retention device, as shown in FIG. 9. The depicted cable strain relief 500 is for illustration purposes, other strain reliefs may be utilized based on the terminal types in cable types. For example, the strain relief 500 may be a myriad yarn retention element, clam shell clip, or the like.

Figure 8:
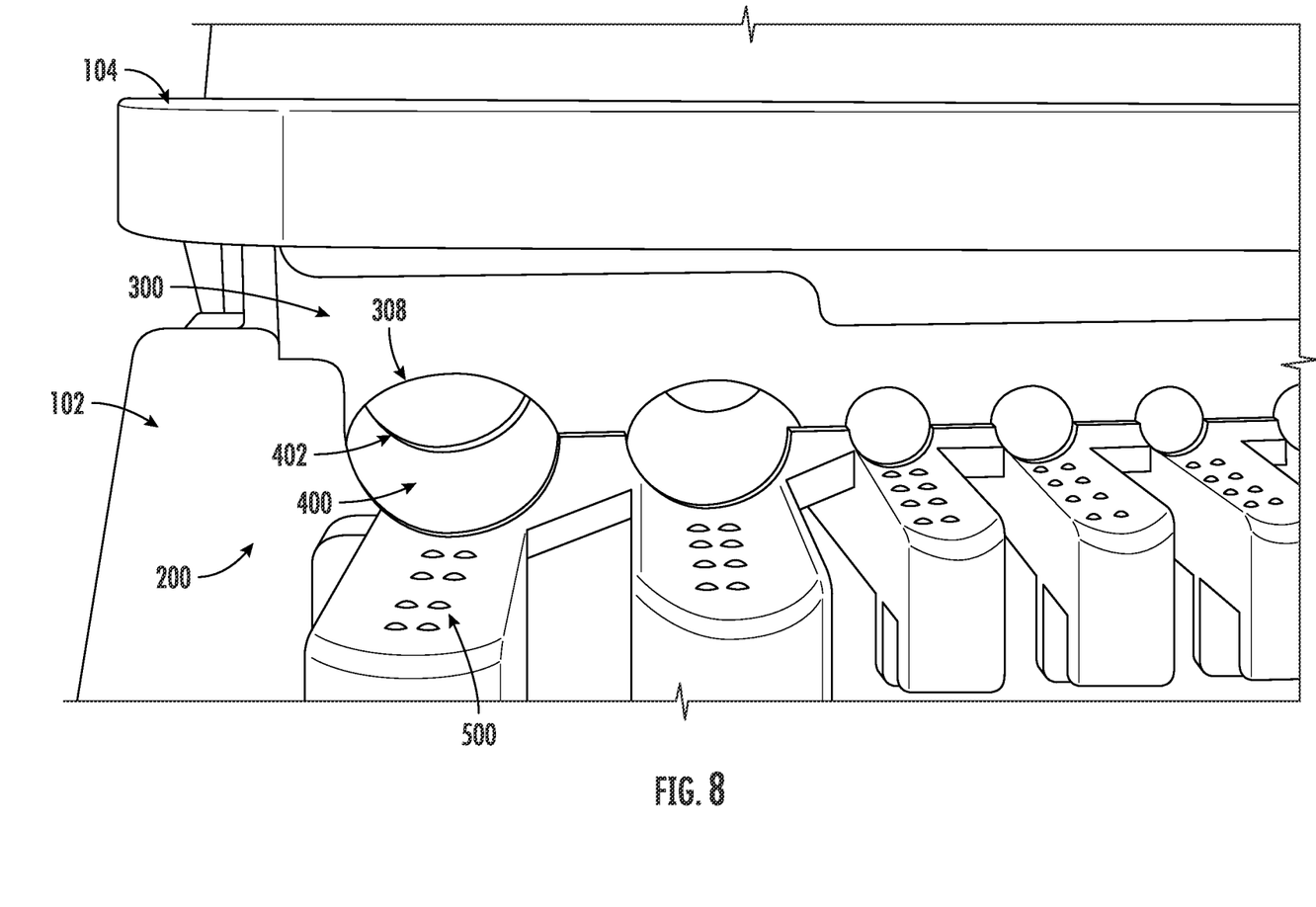
FIG. 8 illustrate a perspective view of a cable port seal in a fiber optic assembly in an closed position according to an example embodiment.

FIGS. 7 and 8 illustrate the decremental or step down of the dimeter of the cable cutouts 308 of the multi-layer seal 300. FIG. 9 illustrates the cable port seal of FIGS. 7 and 8 with an input cable 108 installed in the cable port seal 200 according to an example embodiment. The input cable 108 is positioned on the cable strain relief 500 and held in place by a cable tie 502. The fiber optic terminal 100 is in a closed position, which compresses the sealing material of the sealing block 400 and the multi-layer seal 300 about the input cable 108. In the depicted embodiment, a portion of the cable cutouts 308 of the sealing members 302 of the multi-layer seal and the cable cutouts 402 of the sealing block 400 are deformed around the input cable 108 by the compression, resulting in an environmental seal.

In an example embodiment, a fiber optic assembly is provided including a housing, a cable port configured for one or more fiber optic cables to pass from an exterior of the housing to an interior of the housing, and a first cable port seal disposed in the cable port. The first cable port seal includes an upper element and a lower element configured for the one or more fiber optic cables to pass and be compressed therebetween to provide a water and/or debris resistant environmental barrier. The upper element or the lower element include a first sealing member having a first face, an opposing second face, and a first sealing edge having a first end and a second end, the first sealing edge comprising at least one first cable cutout disposed proximate to each of the first end and the second end of the first sealing member, and a second sealing member having a third face, an opposing fourth face, and a second sealing edge with a first end and a second end, the second sealing edge comprising at least one second cable cutout disposed proximate to each of the first end and the second end of the second sealing member. The second sealing edge also includes at least one third cable cutout disposed between the at least one second cable cutouts, the at least one third cable cutout is different from the at least one second cable cutout in diameter or shape, and the first face of the first sealing member is in contact with the third face of the second sealing member.

In some example embodiments, the upper element or the lower element also include a third sealing member having a fifth face, an opposing sixth face, and a third sealing edge with a first end and a second end, the third sealing edge comprising at least one fourth cable cutout disposed proximate to each of the first end and the second end of the third sealing member. The at least one fourth cable cutout includes a different diameter than the at least one first cable cutout. In an example embodiment, the first sealing member, the second sealing member, and the third sealing member of the first cable port seal are integrally formed from a sheet of sealing material. In some example embodiments, the upper element or the lower element is configured to be transitioned from a sheet form to a multi-layer form by folding or stacking. In an example embodiment, the first cable port seal is approximately 5 mm thick in the sheet form and approximately 15 mm thick in the multi-layer form. In some example embodiments, the at least one second cable cutouts include a larger diameter than the at least one first cable cutouts. In an example embodiment, the each of the at least one first cable cutouts, the at least one second cable cutouts, and the at least one third cable cutouts include semi-circular cutouts. In some example embodiments, the other of the lower element or the upper element includes a sealing face disposed opposite to the first sealing edge and the second sealing edge. In an example embodiment, the first sealing member and the second sealing member each include a sealing material formed from polyethylene foam, polyurethane foam, neoprene, silicone foam, or rubber. In some example embodiments, a diameter of the at least one first cable cutouts comprises 6 mm, 12 mm, or 15 mm.

In another embodiment, a cable port seal for a cable port configured for one or more communication cables to pass from an exterior of a housing to an interior of the housing is provided. The cable port seal includes an upper element and a lower element configured for the one or more communication cables to pass and be compressed therebetween to provide a water and/or debris resistant environmental barrier. The upper element or the lower element include a first sealing member having a first face, an opposing second face, and a first sealing edge having a first end and a second end, the first sealing edge including at least one first cable cutout disposed proximate to each of the first end and the second end of the first sealing member, and a second sealing member having a third face, an opposing fourth face, and a second sealing edge with a first end and a second end, the second sealing edge comprising at least one second cable cutout disposed proximate to each of the first end and the second end of the second sealing member. The second sealing edge also includes at least one third cable cutout disposed between the at least one second cable cutouts, the at least one third cable cutout is different from the at least one second cable cutout in diameter or shape, and the first face of the first sealing member is in contact with the third face of the second sealing member.

In some example embodiments, the upper or the lower element also includes a third sealing member having a fifth face, an opposing sixth face, and a third sealing edge with a first end and a second end, the third sealing edge includes at least one fourth cable cutout disposed proximate to each of the first end and the second end of the third sealing member, the at least one fourth cable cutout comprises a different diameter than the at least one first cable cutout. In an example embodiment, the first sealing member, the second sealing member, and the third sealing member of the cable port seal are integrally formed from a sheet of sealing material. In some example embodiments, the upper element or the lower element is configured to be transitioned from a sheet form to a multi-layer form by folding or stacking. In an example embodiment, the cable port seal is approximately 5 mm thick in the sheet form and approximately 15 mm thick in the multi-layer form. In some example embodiments, the at least one second cable cutouts includes a larger diameter than the at least one first cable cutouts. In an example embodiment, the each of the at least one first cable cutouts, the at least one second cable cutouts, and the at least one third cable cutouts include semi-circular cutouts. In some example embodiments, the other of the upper element and the lower element include a sealing face disposed opposite to the first sealing edge and the second sealing edge. In an example embodiment, the first sealing member and the second sealing member each include a sealing material formed from polyethylene foam polyurethane foam, neoprene, silicone foam, or rubber.

In yet a further example embodiment, a cable port seal for a cable port configured for one or more communication cables to pass from an exterior of a housing to an interior of the housing is provided. The cable port seal includes an upper element and a lower element configured for the one or more communication cables to pass and be compressed therebetween to provide a water and/or debris resistant environmental barrier. The upper element or the lower element include a plurality of sealing members, each of the plurality of sealing members having a first face, an opposing second face, and a sealing edge, wherein at least one of the plurality of sealing members includes a plurality of cable cutouts. The a face of a first sealing member is in contact with a second face of an adjacent second sealing member, the plurality of sealing members are integrally formed from a sheet of sealing material, and upper element or lower element is configured to transition from a sheet form to a multi-layer form by folding or stacking.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A fiber optic assembly comprising:
   a housing;
   a cable port configured for one or more fiber optic cables to pass from an exterior of the housing to an interior of the housing; and
   a first cable port seal disposed in the cable port, the first cable port seal comprising:
   an upper element and a lower element configured for the one or more fiber optic cables to pass and be compressed therebetween to provide an environmental barrier, the upper element or the lower element comprising;
   a first sealing member having a first face, an opposing second face, and a first sealing edge having a first end and a second end, the first sealing edge comprising at least one first cable cutout disposed proximate to each of the first end and the second end of the first sealing member; and
   a second sealing member having a third face, an opposing fourth face, and a second sealing edge with a first end and a second end, the second sealing edge comprising at least one second cable cutout disposed proximate to each of the first end and the second end of the second sealing member, wherein the second sealing edge also comprises at least one third cable cutout disposed between the at least one second cable cutouts, wherein the at least one third cable cutout is different from the at least one second cable cutout in diameter or shape,
wherein the first face of the first sealing member is in contact with the third face of the second sealing member.

2. The fiber optic assembly of claim 1, wherein the upper element or the lower element further comprises:
   a third sealing member having a fifth face, an opposing sixth face, and a third sealing edge with a first end and a second end, the third sealing edge comprising at least one fourth cable cutout disposed proximate to each of the first end and the second end of the third sealing member,
   wherein the at least one fourth cable cutout comprises a different diameter than the at least one first cable cutout.

3. The fiber optic assembly of claim 2, wherein the first sealing member, the second sealing member, and the third sealing member of the first cable port seal are integrally formed from a sheet of sealing material.

4. The fiber optic assembly of claim 3, wherein the upper element or the lower element is configured to be transitioned from a sheet form to a multi-layer form by folding or stacking.

5. The fiber optic assembly of claim 4, wherein the first cable port seal is approximately 5 mm thick in the sheet form and approximately 15 mm thick in the multi-layer form.

6. The fiber optic assembly of claim 1, wherein the at least one second cable cutouts comprise a larger diameter than the at least one first cable cutouts.

7. The fiber optic assembly of claim 1, wherein the each of the at least one first cable cutouts, the at least one second cable cutouts, and the at least one third cable cutouts comprise semi-circular cutouts.

8. The fiber optic assembly of claim 1, wherein the other of the lower element or the upper element comprises a sealing face disposed opposite to the first sealing edge and the second sealing edge.

9. The fiber optic assembly of claim 1, wherein the first sealing member and the second sealing member each comprise a sealing material formed from polyethylene foam, polyurethane foam, neoprene, silicone foam, or rubber.

10. The fiber optic assembly of claim 1, wherein a diameter of the at least one first cable cutouts comprises 6 mm, 12 mm, or 15 mm.

11. A cable port seal for a cable port configured for one or more communication cables to pass from an exterior of a housing to an interior of the housing, the cable port seal comprising:
   an upper element and a lower element configured for the one or more communication cables to pass and be compressed therebetween to provide an environmental barrier, the upper element or the lower element comprising;
      a first sealing member having a first face, an opposing second face, and a first sealing edge having a first end and a second end, the first sealing edge comprising at least one first cable cutout disposed proximate to each of the first end and the second end of the first sealing member; and
      a second sealing member having a third face, an opposing fourth face, and a second sealing edge with a first end and a second end, the second sealing edge comprising at least one second cable cutout disposed proximate to each of the first end and the second end of the second sealing member, wherein the second sealing edge also comprises at least one third cable cutout disposed between the at least one second cable cutouts, wherein the at least one third cable cutout is different from the at least one second cable cutout in diameter or shape,
   wherein the first face of the first sealing member is in contact with the third face of the second sealing member.

12. The cable port seal of claim 11, wherein the upper or the lower element further comprises:
   a third sealing member having a fifth face, an opposing sixth face, and a third sealing edge with a first end and a second end, the third sealing edge comprising at least one fourth cable cutout disposed proximate to each of the first end and the second end of the third sealing member,
   wherein the at least one fourth cable cutout comprises a different diameter than the at least one first cable cutout.

13. The cable port seal of claim 12, wherein the first sealing member, the second sealing member, and the third sealing member of the cable port seal are integrally formed from a sheet of sealing material.

14. The cable port seal of claim 13, wherein the upper element or the lower element is configured to be transitioned from a sheet form to a multi-layer form by folding or stacking.

15. The cable port seal of claim 14, wherein the cable port seal is approximately 5 mm thick in the sheet form and approximately 15 mm thick in the multi-layer form.

16. The cable port seal of claim 11, wherein the at least one second cable cutouts comprise a larger diameter than the at least one first cable cutouts.

17. The cable port seal of claim 11, wherein the each of the at least one first cable cutouts, the at least one second cable cutouts, and the at least one third cable cutouts comprise semi-circular cutouts.

18. The cable port seal of claim 11, wherein the other of the upper element and the lower element comprises a sealing face disposed opposite to the first sealing edge and the second sealing edge.

19. The cable port seal of claim 11, wherein the first sealing member and the second sealing member each comprise a sealing material formed from polyethylene foam polyurethane foam, neoprene, silicone foam, or rubber.

20. A cable port seal for a cable port configured for one or more communication cables to pass from an exterior of a housing to an interior of the housing, the cable port seal comprising:

an upper element and a lower element configured for the one or more communication cables to pass and be compressed therebetween to provide an environmental barrier, the upper element or the lower element comprising;
    a plurality of sealing members, each of the plurality of sealing members having a first face, an opposing second face, and a sealing edge, wherein at least one of the plurality of sealing members comprises a plurality of cable cutouts;
wherein the first face of a first sealing member is in contact with a second face of an adjacent second sealing member, and the plurality of sealing members are integrally formed from a sheet of sealing material, and the upper element or the lower element is configured to transition from a sheet form to a multi-layer form by folding or stacking.

\* \* \* \* \*